United States Patent [19]
Parker

[11] 4,103,932
[45] Aug. 1, 1978

[54] PIVOT CONSTRUCTION FOR A MOTOR VEHICLE SUSPENSION SYSTEM

[75] Inventor: Robert J. Parker, Southfield, Mich.

[73] Assignee: Ford Motor Company, Dearborn, Mich.

[21] Appl. No.: 735,464

[22] Filed: Oct. 26, 1976

[51] Int. Cl.² .......................................... B60G 11/12
[52] U.S. Cl. ................................. 280/718; 267/54 R
[58] Field of Search ............... 280/694, 699, 718, 719, 280/720, 669, 680, 686; 267/54 R, 54 B, 54 E; 308/72

[56] References Cited

U.S. PATENT DOCUMENTS

| | | | |
|---|---|---|---|
| 1,767,717 | 6/1930 | Stover | 267/54 E |
| 2,435,935 | 2/1948 | Voorhies | 308/72 |
| 3,218,054 | 11/1965 | Nallinger | 267/54 E |
| 3,400,945 | 9/1968 | Sampietro | 280/664 |
| 3,574,368 | 4/1971 | Songer | 308/72 |
| 3,578,366 | 5/1971 | Snidar | 308/72 |

FOREIGN PATENT DOCUMENTS 81,102  10/1951  Czechoslovakia ..................... 280/699

Primary Examiner—Joseph F. Peters, Jr.
Assistant Examiner—John A. Carroll
Attorney, Agent, or Firm—Clifford L. Sadler; Keith L. Zerschling

[57] ABSTRACT

A pivot construction for a motor vehicle suspension system according to the present disclosure includes a pair of ball studs having shank portions fitted in the eye at the end of a leaf spring. The heads of the ball studs are each enclosed by a cup-shape polyethylene bearing that is retained within a socket. The sockets for the ball studs are supported by spaced portions of a bifurcated vehicle frame bracket. A pair of first seals retain lubricant within the bearings and a pair of second seals prevent the entry of contaminates into the spring eye that might corrode the surfaces of the shank portions of the ball studs.

7 Claims, 4 Drawing Figures

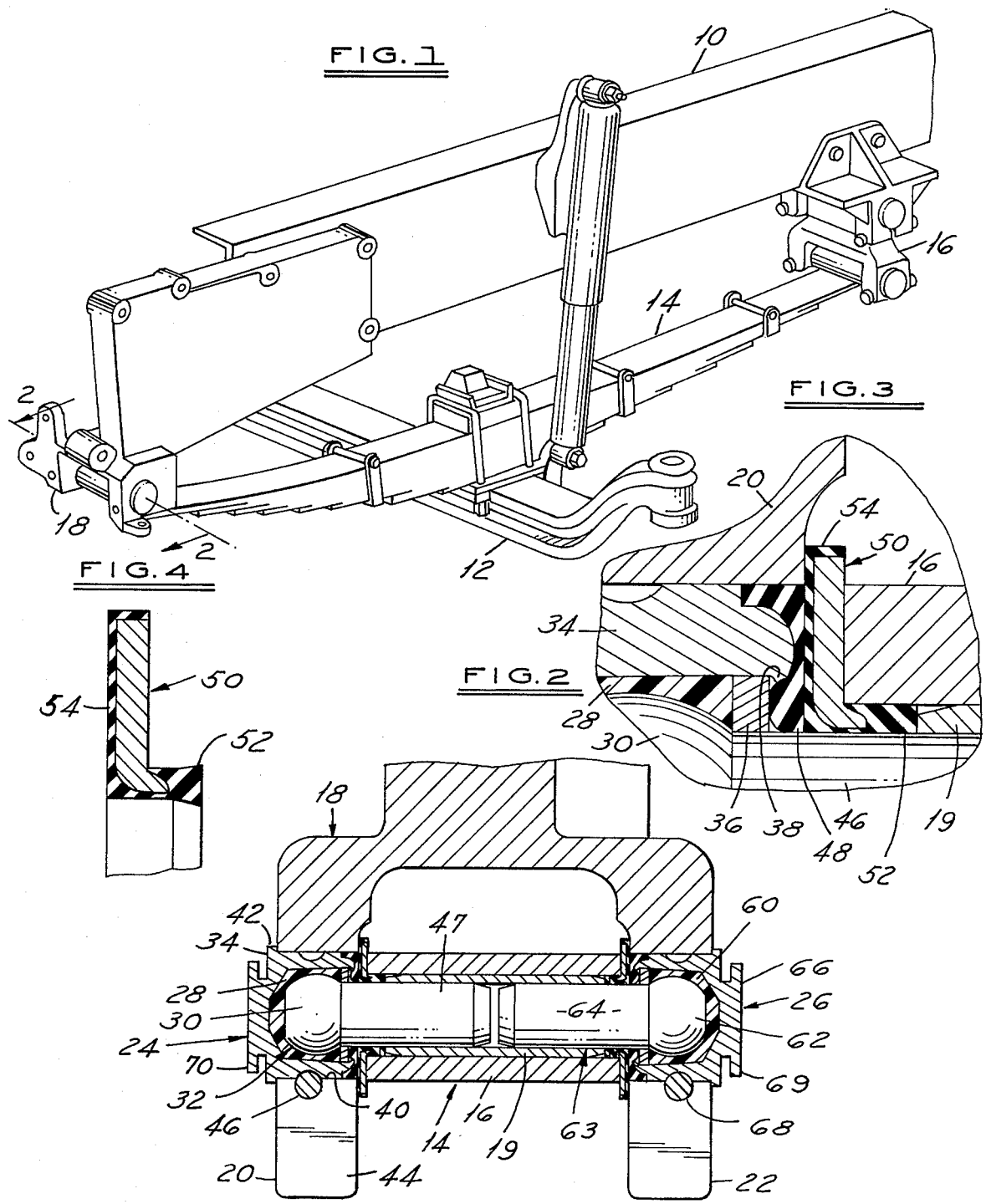

PIVOT CONSTRUCTION FOR A MOTOR VEHICLE SUSPENSION SYSTEM

BACKGROUND AND SUMMARY OF THE DISCLOSURE

The present invention relates to motor vehicle suspension systems and, more particularly, to a pivot construction for such systems. In accordance with the presently preferred embodiment of this disclosure, the pivot construction connects the end of a leaf spring with a vehicle frame bracket.

The pivot construction includes a pair of ball and socket joints with each joint comprising a ball stud having a shank portion and a head portion. The head portion of each joint is enclosed by a cup-shape polyethylene bearing which, in turn, is nestled within a socket part. A retaining ring encircles the shank and engages the end of the bearing. The open end of the socket is spun over against the retaining ring and exerts a preload upon the polyethylene bearing. An elastomeric annular seal sealingly engages the exterior of the spun over end of the socket, the retaining ring and the shank portion of the ball stud.

The end of the leaf spring is formed into an eye that receives a sleeve. A generally hat-shape combination thrust washer and seal member is situated at each end of the spring eye. These members have axially extending elastomeric portions that are fitted within the spring eye and engage the ends of the sleeve. The frame bracket has a bifurcated construction with a pair of aligned holes. The socket parts of the two joints are seated in the holes in the frame bracket. The shanks of the ball studs extend through the center thrust washer and seal members and into the sleeve within the spring eye. The ends of the shanks are juxtaposed. The bifurcations of the frame bracket have radially extending slots and a pinch bolt extends through each of the bifurcations to secure the socket parts to the bracket.

A suspension pivot according to this invention is characterized by its durability and its suitability for heavy duty truck applications. The seal at the mouth of the socket retains lubricant within the bearing cups. The combination thrust washer and seal members have portions which engage the spring eye, the shank portions of the ball studs and the ends of the sleeve whereby contaminants are excluded.

The double ball and socket joint construction of this suspension pivot automatically compensates for minor misalignment that may occur between the leaf spring and the frame bracket. Further, the ball and socket construction offers minimum frictional resistance to angular displacement of the spring with respect to the frame bracket. In addition, the seal arrangement assures long bearing life.

BRIEF DESCRIPTION OF THE DRAWINGS

The many objects and advantages of a pivot construction for a motor vehicle suspension in accordance with this invention will become apparent upon consideration of the following detailed discussion and the accompanying drawings, in which:

FIG. 1 is a perspective view of a motor vehicle suspension having a pivot construction embodying this invention;

FIG. 2 is a sectional view taken along section line 2—2 of FIG. 1;

FIG. 3 is an enlarged sectional view of a portion of the construction of FIG. 2; and FIG. 4 is a sectional view of the combination thrust washer and seal used in the suspension pivot of FIG. 2.

DETAILED DESCRIPTION OF THE PRESENTLY PREFERRED EMBODIMENT

Referring now to the drawings, wherein the presently preferred embodiment of this invention is illustrated, FIG. 1 discloses a motor vehicle suspension having a novel pivot construction. In the suspension of FIG. 1, a vehicle frame 10 is resiliently supported on a front axle 12 by leaf spring assembly 14. The rearward end of the leaf spring is connected to the frame member 10 by means of a spring shackle 16. The forward end of the leaf spring 14 is connected to a frame bracket 18 by means of a suspension pivot construction that is shown in detail in FIG. 2.

The leaf spring 14 has its forward end formed with a spring eye 16. A sleeve 19 is fitted within the spring eye 16 and has its ends spaced from the ends of the eye. The frame bracket 18 is provided with bifurcations 20 and 22 that are pivotally connected to the spring eye 16 by means of left and right ball and socket joint assemblies 24 and 26. These assemblies are of identical construction.

The left ball joint 24 includes a polyethylene bearing 28 of generally cup-shape construction which encloses the ball portion 30 of a ball stud 32. The plastic bearing 28 is retained within a socket part 34 by means of a retaining ring 36 and the spun-over edge 38 of the socket 34. The spun-over edge 38 exerts a load on the retaining ring 36 that preloads the bearing 28.

The socket part 34 is situated within a hole 40 formed in the bracket bifurcation 20 and is located therein by a radial flange 42 that is seated against the outside face of the bifurcation. The bifurcation 20 has a slot 44 that extends radially from the edge of the hole 40. The socket part 34 is secured in the hole 40 by means of a pinch bolt 46.

The ball stud 32 of the joint 24 has a shank portion 47 that extends into the interior of the sleeve 19. An annular rubber seal 48 engages the end of the socket 34 and sealingly engages the retaining ring 36 and the shank 47 of the ball stud 32.

A combination thrust washer and seal member 50 has a generally hat-shape construction positioned at the end of the spring eye 16. As seen in FIG. 3, the member 50 is of composite construction with a metal backing piece that supports a rubber piece. A rubber portion 52 of the member 50 is disposed within the eye 16 and sealingly engages the interior of the eye and the shank 47 of the ball stud 32. The rubber portion 52 also sealingly engages the end of the sleeve 19. A rubber coating 54 on the member 50 sealingly engages the adjacent face of the bifurcation 20 of the bracket 18 as well as the seal 48 and a portion of the shank 47.

The ball and socket joint 26 is constructed in a manner similar to that of the joint 24. It includes a plastic cup-shape bearing 60 that encloses a ball 62 of a ball stud 63. The stud 63 has a shank portion 64 that is fitted within the sleeve 19. The bearing 60 is situated within a socket 66 which, in turn, is retained within a hole in the bifurcation 22 by means of a pinch bolt 68. A pair of seals, similar to seals 48 and 50, protect the components of the joint 26.

The socket part 66 includes a radially extending flange 69 that is constructed to receive a tool. This arrangement permits the socket 66, and thus the ball joint assembly 26, to be withdrawn from the hole in the bifurcation 22, after the pinch bolt 68 is removed. The socket 34 of joint 24 is similarly equiped with a tool receiving flange 70. The ball joint assemblies 24 and 26 are pulled axially outwardly in order to disassemble the suspension pivot.

In operation, the wheel supporting axle 12 of the suspension of FIG. 1 will traverse a jounce and rebound path as the vehicle's wheels move over irregularities in the road. At the same time, the spring 14 will flex and the eye 16 of the spring will pivot about the axis extending through the ball studs 47 and 64, The polyethylene bearing cups 28 and 60 permit low friction movement between the pivot parts. The seals assure that the bearings 28 and 60 retain lubrication and the pivot parts do not become contaminated which could lead to premature wear.

The foregoing description presents the presently preferred embodiment of this invention. Details of construction have been shown and described for purposes of illustration rather than limitation. Modifications and alteration of the invention may occur to those skilled in the art that will come within the scope and spirit of the following claims.

I claim:

1. A pivot means constructed to interconnect first and second members for angular displacement of one of said members relative to the other of said members about a fixed pivot axis;
   said pivot means comprising a pair of ball studs;
   each of said ball studs having a shank portion and a head portion;
   said shank portions being in axial alignment with the ends of said shank portions being in juxtaposed relationship;
   a sleeve surrounding said shank portions supported by one of said members;
   a pair of socket means enclosing said head portions of said pair of ball studs;
   each of said socket means being secured to the other of said members.

2. A pivot means according to claim 1 and including:
   one of said socket means comprising a plastic bearing supported in a socket part;
   an annular retaining ring disposed in said socket part and engaging an end of said bearing;
   said socket part having a peripheral lip engaging said retaining ring and exerting a preload on said bearing;
   a first annular seal having a portion engaging said peripheral lip of said socket part, said retaining ring and said shank portion of the most adjacent ball stud;
   an annular thrust washer and seal having a hat-shape metal core and an elastomeric coating over substantial portions of the exterior surface of said core;
   said thrust washer and seal sealingly engaging said shank portion of said most adjacent ball stud and said sleeve.

3. A pivot means for a suspension system for a motor vehicle having a frame member, a wheel support member constructed to rotatably support a road wheel and a leaf spring interconnecting said frame member and said wheel support member;
   said pivot means being connected to said leaf spring and said frame member;
   a pair of spaced apart supports connected to said frame member;
   said leaf spring having an eye formed at one end and said eye being disposed between said supports;
   a pair of ball studs having shank portions disposed in said eye;
   said ball studs having a pair of spaced apart head portions;
   each of said head portions being rotably supported in a socket means;
   said socket means being secured to said spaced apart supports;
   whereby said leaf spring may deflect about a pivot axis that extends through said pair of spaced apart head portions and is fixed relative to said head portions and said socket means.

4. A pivot means according to claim 3 and including:
   an annular thrust washer and seal surrounding said shank portions of each of said ball studs;
   said thrust washers and seals having elastomeric sealing surfaces engaging said shank portions of said ball studs.

5. A pivot means according to claim 4 and including:
   said thrust washers and seals each having a hat-shape metal core and an elastomeric coating over substantial portions of the exterior surface of said core;
   said thrust washers and seals each having an elastomeric portion engaging the shank portion of one of said ball studs;
   said elastomeric portions being fitted within said eye.

6. A pivot means according to claim 3 and including:
   one of said socket means comprising a cup-shape plastic bearing supported in a socket part;
   an annular retaining ring disposed in said socket part and engaging an end of said bearing;
   said socket part having a peripheral lip engaging said retaining ring and exerting a preload on said bearing;
   a first annular seal having a portion engaging said peripheral lip of said socket part, said retaining ring and said shank of said ball stud supported in said one socket means.

7. A suspension system for a motor vehicle having a frame member, a wheel support member constructed to rotatably support a road wheel and a leaf spring interconnecting said frame member and said wheel support member;
   pivot means connected to said leaf spring and to said frame member;
   a pair of spaced apart supports connected to said frame member;
   said leaf spring having an eye formed at one end and said eye being disposed between said supports;
   a pair of ball studs each having a shank portion and a head portion;
   said shank portions being arranged in axial alignment with the ends of said shank portions being in juxtaposed relationship;
   a sleeve surrounding said shank portions and supported within said eye;
   said ball studs having a pair of spaced apart head portions;
   each of said head portions being rotatably supported in a socket means;
   said socket means being secured to said spaced apart supports;
   one of said socket means comprising a plastic bearing disposed in a socket part;

an annular retaining ring disposed in said socket part and engaging an end of said bearing;

said socket part having a peripheral lip engaging said retaining ring and exerting a preload on said bearing;

a first annular seal having a portion engaging said peripheral lip of said socket part, said retaining ring and said shank portion of the most adjacent ball stud;

an annular thrust washer and seal having a hat-shape metal core and an elastomeric coating over substantial portions of the exterior surface of said core;

said thrust washer and seal sealingly engaging said shank portion of said most adjacent ball stud and said sleeve;

whereby said leaf spring may deflect about a pivot axis that extends through said pair of spaced apart head portions and is fixed relative to said head portions and said socket means.

* * * * *

Disclaimer 4,103,932.—*Robert J. Parker*, Southfield, Mich. PIVOT CONSTRUCTION FOR A MOTOR VEHICLE SUSPENSION SYSTEM. Patent dated Aug. 1, 1978. Disclaimer filed Apr. 14, 1982, by the assignee, *Ford Motor Co.*

Hereby enters this disclaimer to claims 1, 3, 4 and 6 of said patent.

[*Official Gazette June 29, 1982.*]